(12) United States Patent
Sathe et al.

(10) Patent No.: US 8,482,560 B2
(45) Date of Patent: Jul. 9, 2013

(54) IMAGE FORMING TECHNIQUES

(75) Inventors: Rahul P. Sathe, Hillsboro, OR (US); Paul A. Rosen, West Lafayette, IN (US)

(73) Assignee: Intel Corporation, Santa Clara, CA (US)

( * ) Notice: Subject to any disclaimer, the term of this patent is extended or adjusted under 35 U.S.C. 154(b) by 787 days.

(21) Appl. No.: 12/387,187

(22) Filed: Apr. 29, 2009

(65) Prior Publication Data

US 2010/0164955 A1  Jul. 1, 2010

Related U.S. Application Data

(63) Continuation-in-part of application No. 12/347,114, filed on Dec. 31, 2008.

(51) Int. Cl.
    *G06T 15/00* (2011.01)
(52) U.S. Cl.
    USPC .......................... 345/423; 345/419; 345/428
(58) Field of Classification Search
    USPC ......................... 345/419, 422, 423, 426, 428
    See application file for complete search history.

(56) References Cited

U.S. PATENT DOCUMENTS

| | | | | |
|---|---|---|---|---|
| 6,597,356 | B1 * | 7/2003 | Moreton et al. | 345/423 |
| 6,600,488 | B1 * | 7/2003 | Moreton et al. | 345/423 |
| 6,940,505 | B1 * | 9/2005 | Savine et al. | 345/423 |
| 7,639,252 | B2 * | 12/2009 | Goel | 345/423 |
| 7,928,979 | B2 * | 4/2011 | Patel et al. | 345/423 |
| 2004/0085313 | A1 | 5/2004 | Moreton et al. | |

OTHER PUBLICATIONS

Moreton, Watertight Tessellation Using Forward Differencing, Proceeding of the ACM SIGGRAPH, Aug. 2001, pp. 25-32.*
Office Action Received for German Patent Application No. 10 2010 018 701.1, mailed on Aug. 27, 2010, 4 Pages of German Office Action, and 4 Pages of English Translation.
Shiue, Le-Jeng, "Quasi-Regular Surface Representation", A dissertation presented to the graduate school of the university of florida in partial fulfillment of the requirements for the degree of Doctor of philosophy, 2004, 94 pages.
Gee, Kevin et al., "Direct3D 11 Tessellation," Microsoft Game Technology Conference 2008, 40 pages.
Klein, Allison, "Introduction to the Direct3D 11 Graphics Pipeline," Game Fest 2008, Microsoft Game Technology Conference 2008, 59 pages.
Office Action Received for Chinese Patent Application No. 201010214137.9 mailed on Dec. 31, 2011, 3 pages of Office Action and 1 page of English Translation.

* cited by examiner

*Primary Examiner* — Phu K Nguyen
(74) *Attorney, Agent, or Firm* — Trop, Pruner & Hu, P.C.

(57) ABSTRACT

In some embodiments, the intervals and the triangulation of an inner tessellation of a patch may be pre-computed. Even factor tessellations are arranged in a co-centric manner so that lower number factors are inside tessellations with higher number factors. Similarly, odd factor tessellations are arranged in a co-centric manner so that lower number factors are inside tessellations with higher number factors. Domain points of even factor tessellations are stored in a first table whereas domain points of odd factor tessellations are stored in a second table. At run time, the pre-computed values may be looked up for the applicable edge level of detail.

25 Claims, 9 Drawing Sheets

Even numbered tessellations

Odd numbered tessellations

IMAGE FORMING TECHNIQUES

RELATED APPLICATION

This application is a continuation-in-part of U.S. patent application having Ser. No. 12/347,114, entitled "A TESSELLATOR WHOSE TESSELLATION TIME GROWS LINEARLY WITH THE AMOUNT OF TESSELLATION," filed Dec. 31, 2008, inventors Sathe and Rosen. This application incorporates by reference the contents of that application in its entirety.

FIELD

The subject matter disclosed herein relates generally to graphics processing, including the use of graphics processors and general purpose processors used for graphics processing.

RELATED ART

The graphics pipeline may be responsible for rendering graphics for games, computer animations, medical applications, and the like. The level of detail of the graphics images that are generated may be less than ideal due to limitations in the graphics pipeline. The greater the detail that is provided, the slower the resulting graphics processing. Thus, there is a tradeoff between processing speed and graphics detail. Graphics processing pipelines, such as Microsoft® DirectX 11, increase the geometric detail by increasing the tessellation detail.

Tessellation is the formation of a series of triangles to render an image of an object starting with a coarse polygonal model. A patch is a basic unit at the coarse level describing a control cage for a surface. A patch may represent a curve or region. The surface can be any surface that can be described as a parametric function. A control cage is a low resolution model used by artists to generate smooth surfaces. Thus, by providing a higher extent of tessellation, the level of graphical detail that can be depicted is greater. However, the processing speed may be adversely affected. In general, the processing time increases quadratically with increased image level of detail.

It is desirable to permit greater extent of tessellation but with acceptable processing time.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In accordance with some embodiments, tessellation time increases linearly with the amount of tessellation. Conventionally, tessellation time grows as a quadratic function with the amount of tessellation detail. As a result, in some embodiments, tessellation time may be decreased and, in other embodiments, less powerful tessellators can be used to perform more detailed tessellations.

In some embodiments, the tessellation time may be saved and/or tessellation processing capability may be increased by pre-computing a series of inner tessellations over a range of edge level of detail. This saves computing the inner tessellations at run time. The inner tessellation includes the points and the triangles inside the outer perimeter of the primitive. The outer band is made up of the perimeter of the primitive.

In accordance with some embodiments, two inner tessellations may be pre-computed and stored for availability at run-time. A first inner tessellation may be used for tessellations with even numbered factors whereas a second inner tessellation may be used for tessellations with odd numbered factors. The first inner tessellation may include all inner tessellations with lower numbered even factors. The second inner tessellation may include all inner tessellations with lower numbered odd factors.

In accordance with some embodiments, the first and second inner tessellations are stored as domain points starting with an inner most tessellation and proceeding outward to larger tessellations. The inner most tessellation may be the smallest tessellation. The inner most tessellations of the first and second inner most tessellations may have factors of two and one, respectively. The outermost tessellation of the first and second inner tessellations is the largest even and odd numbered factor tessellation, respectively.

In accordance with some embodiments, the tessellation may use a triangular or quad primitive domain. Edge partitioning may involve dividing the edges into intervals. The more intervals that are used, the higher level of detail of tessellation that is possible. Thus, increasing the edge level of detail may increase the resolution of the resulting tessellation.

Figure 1:
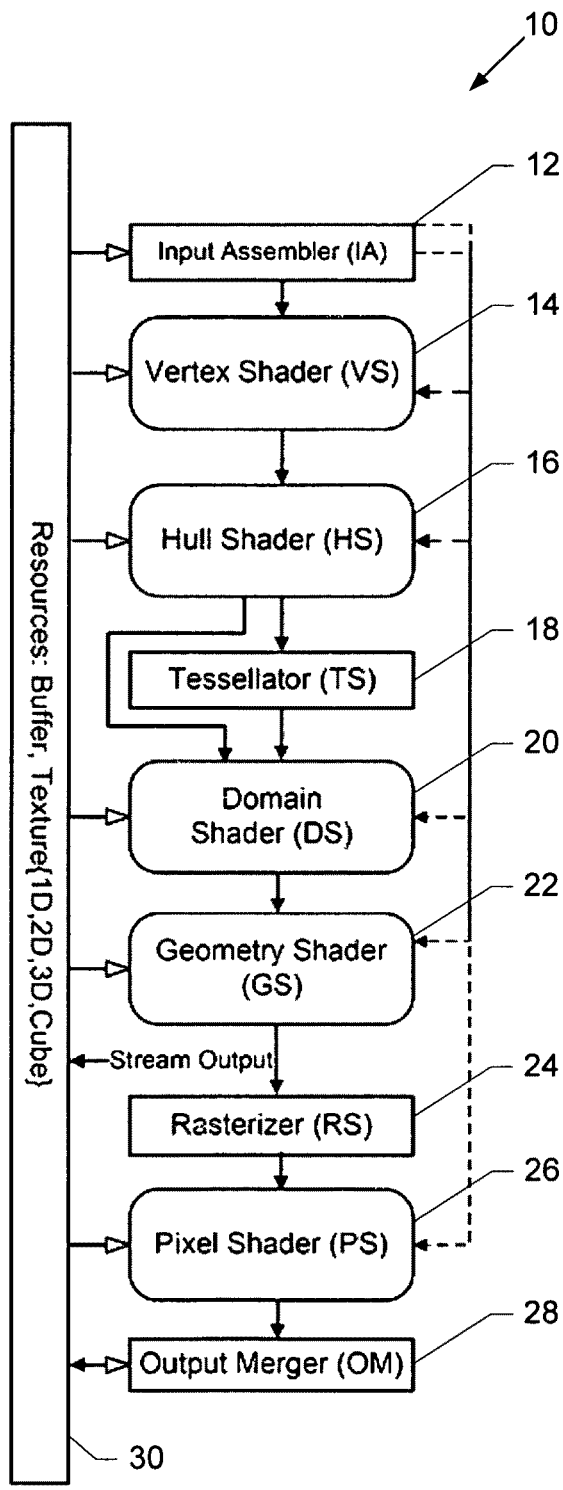
FIG. 1 is a schematic depiction of a graphics pipeline in accordance with one embodiment.

Referring to FIG. 1, a graphics pipeline may be implemented in a graphics processor as a standalone, dedicated integrated circuit, in software, through software implemented general purpose processors or by combinations of software and hardware. In some embodiments, in FIG. 1, the elements with right angle edges can be implemented in hardware and the elements with rounded edges can be implemented in software. The graphics pipeline may be implemented for example in a cellular telephone, a wireless telephone, a Personal Communication Systems (PCS) device, a PDA device which incorporates a wireless communication device, or any computer. The graphics pipeline may provide images or video for display to a display device. Various techniques can be used to transfer images to a display. For example, High-Definition Multimedia Interface, DisplayPort, wireless HDMI, and/or wireless HD compliant techniques can be used to transfer images to a display.

The input assembler 12 reads vertices out of memory using fixed function operations, forming geometry, and creating pipeline work items. Auto generated identifiers enable identifier-specific processing, as indicated on the dotted line on the right in FIG. 1. Vertex identifiers and instance identifiers are available from the vertex shader 14 onward. Primitive identifiers are available from the hull shader 16 onward. The control point identifiers are available only in the hull shader 16.

The vertex shader 14 performs operations such as transformation, skinning, or lighting. It inputs one vertex and outputs one vertex. In the control point phase, invoked per output control point and each identified by a control point identifier, the vertex shader has the ability to read all input control points for a patch independent from output number. The hull shader 16 outputs the control point per invocation. The aggregate output is a shared input to the next hull shader phase and to the domain shader 20. Patch constant phases may be invoked once per patch with shared read input of all input and output control points. The hull shader 16 outputs edge tessellation factors and other patch constant data. As used herein, edge tessellation factor and edge level of detail with a number of intervals per edge of the primitive domain may be used interchangeably. Codes are segmented so that independent work can be done with parallel finishing with a join step at the end.

The tessellator 18 may be implemented in hardware or in software. In some advantageous embodiments, the tessellator may be a software implemented tessellator. By speeding up the operation of tessellator, as described herein, the cores that were doing tessellator operations may be freed up to do other tasks. Tessellator 18 is to retrieve encoded domain points or (u,v) values. Stored encoded domain points may be in unsigned integer format and encoded domain points can be retrieved in a manner described with regard to FIG. 7A or 7B. The tessellator 18 may receive, from the hull shader, numbers defining how much to tessellate. Tessellator 18 generates topologies, such as points, lines, or triangles. Tessellator 18 may output at least one vertex.

In some embodiments, tessellator 18 has the following states and each of the states can be set to the values listed against the state variable.

| State | Possible State Attributes |
|---|---|
| Primitive Domains | Triangles | Quads | Isolines |
| Edge Partitioning | Integer | Pow2 | fractional_odd | fractional_even |
| Inner Tessellation-Factor Reduction Function | min | max | avg |
| Inner Tessellation-Factor Axis Reduction | 1-Axis | 2-Axis |
| Tessellator Output Topology | Point | Line | Triangle_CW | Triangle_CCW |

Domain shader 20 is a programmable stage that uses the domain points, (u,v) values, supplied by tessellator 18 to generate a real 3D point on a patch. In some embodiments, domain shader 20 may be software implemented. In some embodiments, a shader compiler generated portion of domain shader 20 applies scale and bias techniques to convert encoded domain points from tessellator 18 to the domain of [0,1]. Additionally, domain shader 20 may displace the point using a scalar displacement map or calculate other vertex attributes.

Geometry shader 22 may input one primitive and output up to four streams, each independently receiving zero or more primitives. A stream arising at the output of the geometry shader can provide primitives to the rasterizer 24, while up to four streams can be concatenated to buffers 30. Clipping, perspective dividing, view ports, and scissor selection implementation and primitive set up may be implemented by the rasterizer 24.

Pixel shader 26 inputs one pixel and outputs one pixel at the same position or no pixel. The output merger 28 provides fixed function target rendering, blending, depth, and stencil operations.

Figure 2:
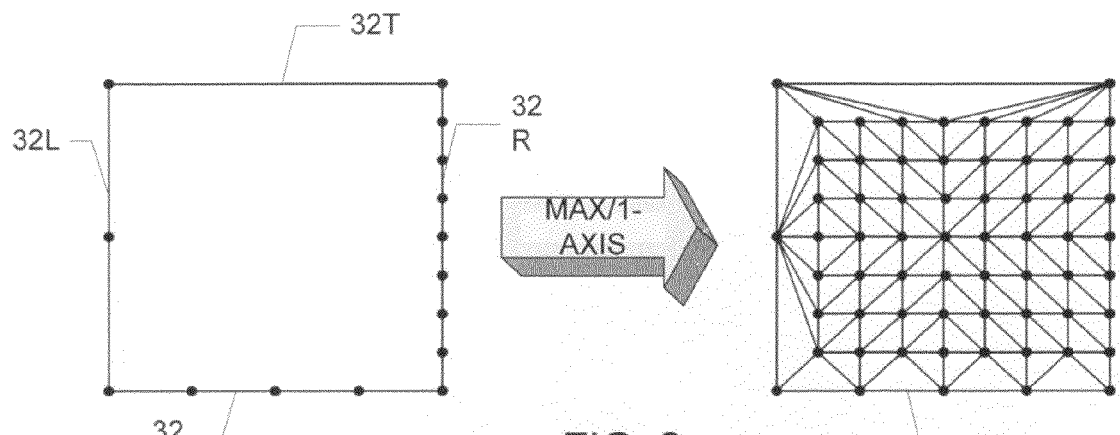
FIG. 2 is a depiction of an inner tessellation with a maximum inner tessellation factor reduction function and a 1-axis inner tessellation factor axis reduction according to one embodiment.

Referring to FIG. 2, according to an embodiment where the primitive is a quad, a quad 32 has a top side 32$t$, a right side 32$r$, a bottom side 32$b$, and a left side 32$l$. In this example, the top side 32$t$ has one interval, the right side 32$r$ has eight intervals, the bottom side 32$b$ has four intervals, and the left side 32$l$ has two intervals. The intervals correspond to the edge level of detail and the tessellation factor. In tessellator 18, an inner tessellation may use a factor reduction function of either minimum, maximum, or average. FIG. 2 shows a maximum reduction function. In this case, the tessellation is implemented using the edge 32$r$ because it has the maximum number of intervals. It calculates only one maximum in this embodiment. In other embodiments, a triangle can be used as the primitive and other inner tessellation reduction functions may be used.

Figure 3:
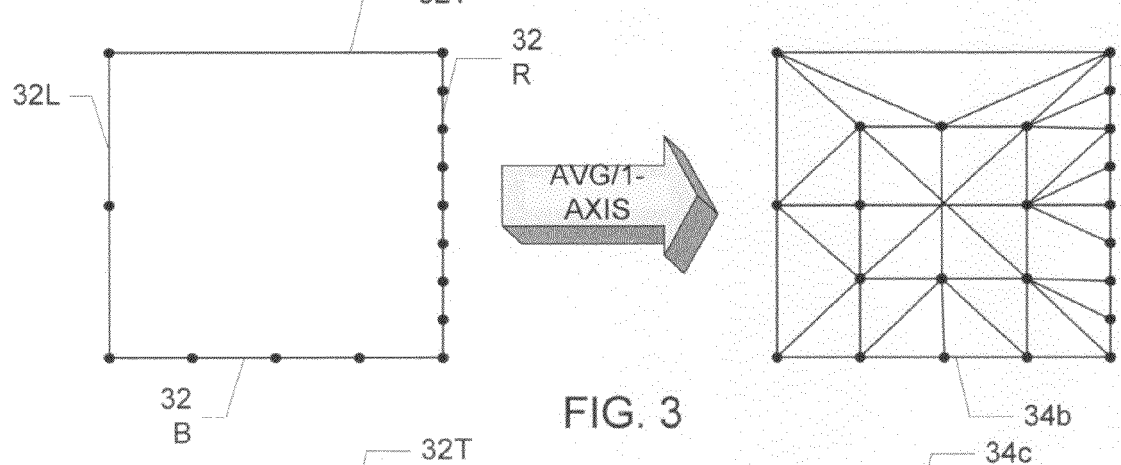
FIG. 3 is a depiction of a tessellation pattern with an average inner tessellation factor reduction function and 1-axis inner tessellation factor axis reduction according to one embodiment.
Figure 4:
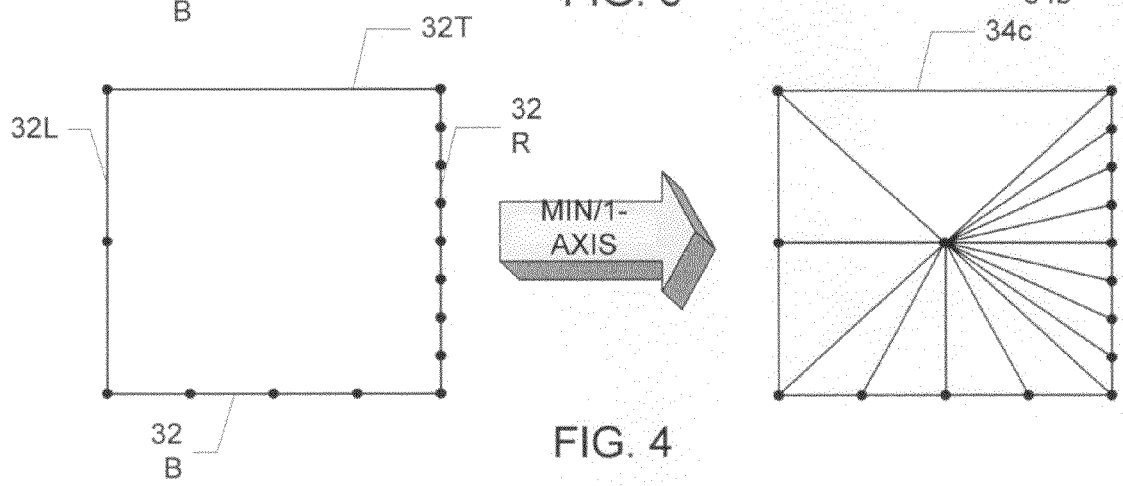
FIG. 4 is a depiction of a tessellation pattern for a 1-axis tessellation using a minimum inner tessellation factor reduction function according to one embodiment.

FIG. 3 shows a quad after processing with an average tessellation factor reduction function. Here, an average is based on the average of the intervals of the four sides. Finally, FIG. 4 shows the result of the minimum tessellation reduction factor uses the minimum side, which would be the top side 32$t$.

Figure 5:
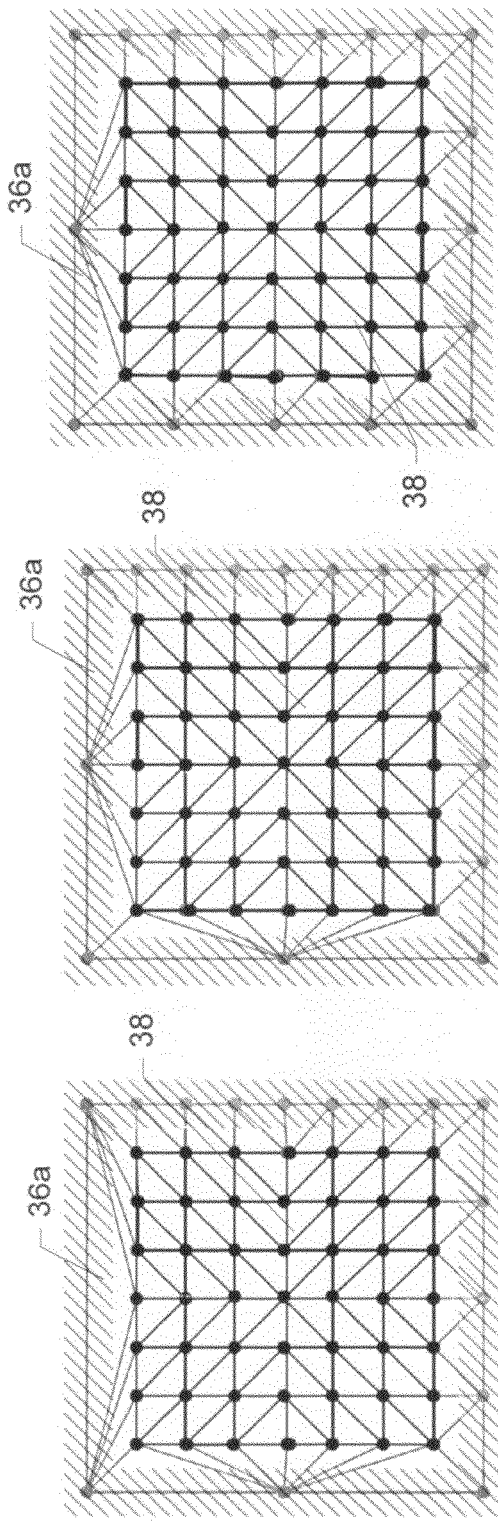
FIG. 5A is a depiction of a 1-axis inner tessellation factor axis reduction according to one embodiment.
FIG. 5B is a 1-axis inner tessellation where the top edge has a different edge level of detail than in FIG. 5A according to one embodiment.
FIG. 5C is a 1-axis inner tessellation where the left edge has a different edge level of detail than the tessellations shown in FIGS. 5A and 5B according to one embodiment.

Referring next to FIGS. 5A-5C, the quad can be divided into an outer band 36$a$ and an inner tessellation 38. The outer band 36$a$ is everything along the perimeter of the primitive domain, in this case a quad, and the inner tessellation is everything else. FIGS. 5A-5C show that in a 1-axis inner tessellation factor reduction example, the inner tessellation is the same, regardless of the number of intervals used in the outer band as long as the maximum of the outer tessellations remain the same. In this example, the tessellation factor reduction function is the maximum and the tessellation factor axis reduction is 1-axis. Thus, regardless of the edge level of detail or tessellation factor, the inner tessellation remains the same. As a result, it is possible to pre-compute the inner tessellations for a variety of different edge level of detail, store them, and simply apply them when needed during run time. Thus, the pre-computed inner tessellations for a range of edge level of detail may be reused and need not be recalculated at run time, speeding the calculation.

Figure 6:
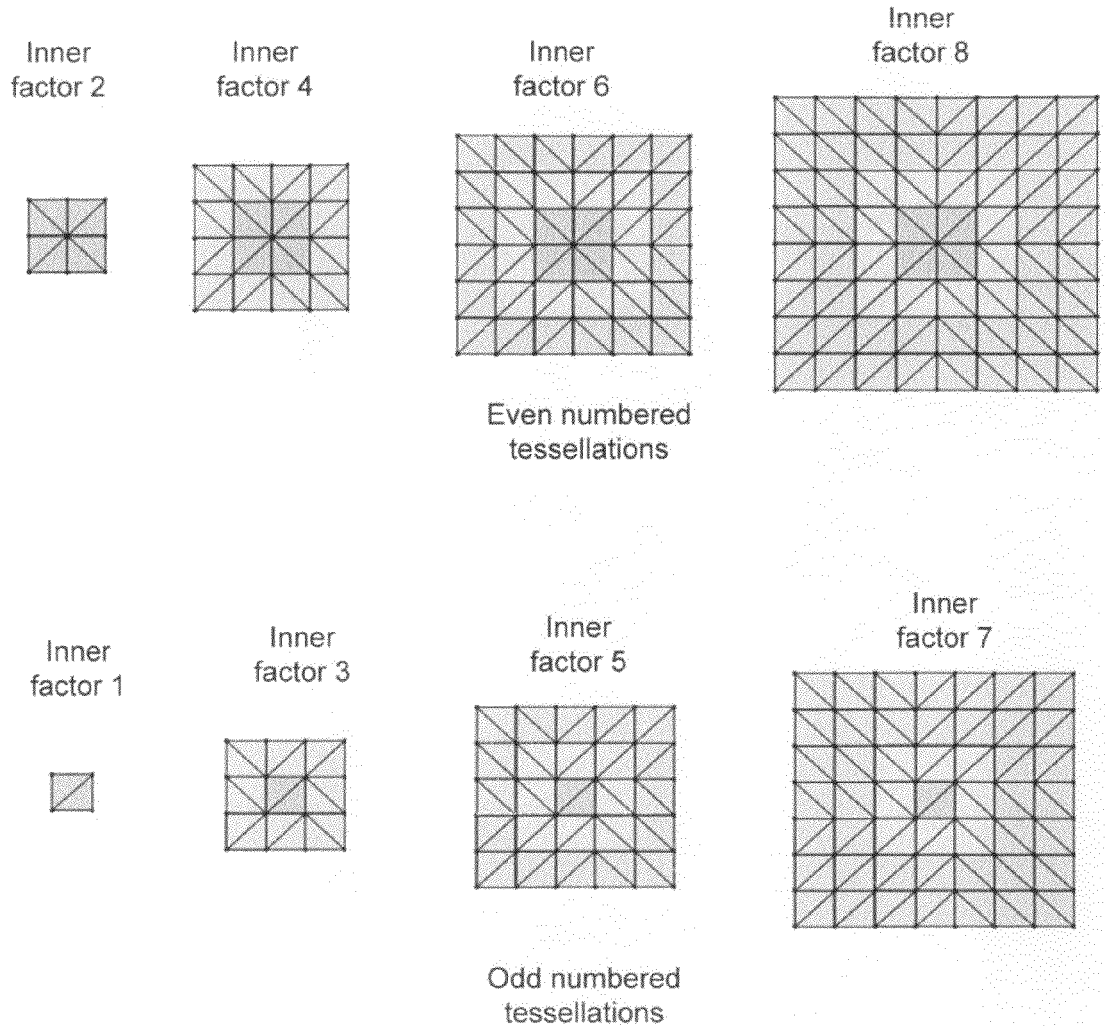
FIG. 6 shows even and odd quad inner tessellations, in accordance with an embodiment.

FIG. 6 shows even and odd quad inner tessellations with a number of intervals ranging from 1 to 8, in accordance with an embodiment. In general, a patch with inner patch tessellation L includes an inner patch tessellation of L−2 and an additional outer ring. In particular, FIG. 6 depicts even and odd interval tessellations. For example, an inner tessellation with interval of 8 includes inner tessellations with intervals of 6, 4, and 2. Similarly, an inner tessellation with interval of 7 includes inner tessellations with intervals of 5, 3, and 1.

In some embodiments, only two tables of domain points are stored for all inner tessellation factors. A first table stores domain points of even inner tessellation factors and a second table stores domain points of odd inner tessellation factors.

The spacing between domain points may differ depending upon the inner tessellation factor because domain points of a tessellation fit within the [0,1] domain. For example, an inner tessellation of two (2) has corner points of (0.25, 0.25) and (0.75, 0.25), whereas the inner tessellation of two (2) inside the outer tessellation of four (4) has corner points of (0.33, 0.33) and (0.66, 0.33). Accordingly, the domain points are not stored within the [0,1] output domain. Instead, in various embodiments, the domain points are stored as signed integers. Scale and bias techniques convert the signed integers to arrive at domain point coordinates within the [0,1] domain. For example, the signed integer is divided by the number of intervals and an offset is added to arrive at domain point coordinates within the [0,1] domain. Storing the domain points as signed integers results in a scale and bias operation performed before the domain points can be input to the domain shader (e.g., domain shader 20 of FIG. 1). Domain shader 20 may perform the scale and bias operation on signed integers to convert the signed integers to the [0,1] domain. The scale and bias operation may be inserted by a shader compiler. A shader compiler translates high level shader programs into a native machine executable language.

In addition, in various embodiments, pre-computed domain points can be stored as two 8-bit signed integers, without any loss in precision. Accordingly, various embodiments use less storage than storing a domain point as two 32-bit floating point numbers. Approximately one-fourth less storage space is used by storing pre-computed domain points can be stored as two 8-bit signed integers as opposed to two 32-bit floating point numbers.

Figure 7A:
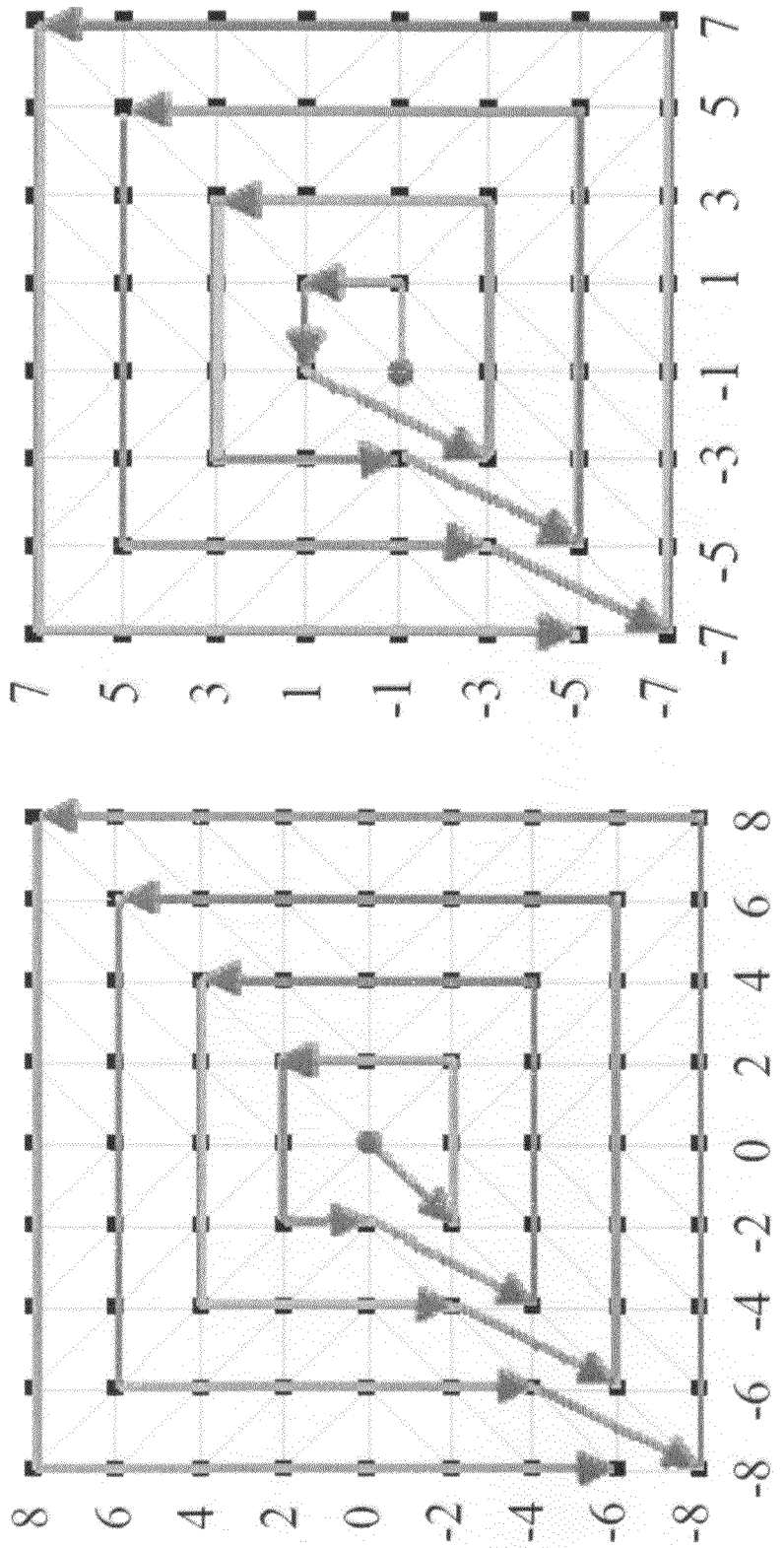
FIG. 7A shows two example manners in which domain points of quad inner tessellations are accessed in accordance with an embodiment.

FIG. 7A shows two example manners in which domain points of quad tessellations are accessed in accordance with an embodiment. In particular, FIG. 7A depicts manners to access domain points of even and odd factor quad tessellations. Domain points for each tessellation begin at the center of a patch and proceed outward. By beginning at the center ring of the patch and working outward in a spiral-like pattern, triangle connectivity is stored in the proper order to support any inner tessellation factor.

Figure 7B:
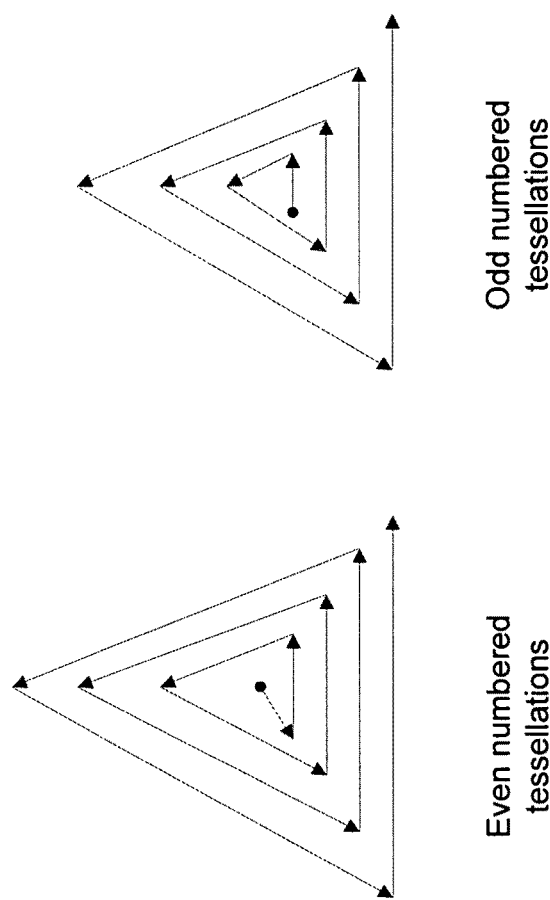
FIG. 7B shows two example manners in which domain points of triangle inner tessellations are accessed in accordance with an embodiment.

FIG. 7B shows two example manners in which domain points of triangle tessellations are accessed in accordance with an embodiment. In particular, FIG. 7B depicts manners to access domain points of even and odd factor triangle tessellations. Domain points for each tessellation begin at the center of a patch and proceed outward so that triangle connectivity is stored in the proper order to support any inner tessellation factor.

In various embodiments, in addition to storing domain points, triangle end points are stored as index values in an index buffer. In some embodiments, there are two index buffers: an index buffer for odd factor inner tessellations and an index buffer for even factor inner tessellations. For example, referring to the even numbered tessellation in FIG. 7A, a first triangle has an end point at the center of the tessellation and two more end points at the second and third domain points along the path of the domain points following the arrow. Accordingly, the first triangle has domain points with indexes of 0, 1, and 2.

Table 1 shows a comparison of a number of triplet pairs of (u,v) coordinates for storage of all triangles for an approach that uses one table for each level of detail (LOD) and embodiments that use two tables for even and odd tessellations. For an inner tessellation factor 64, using two tables for even and odd tessellations may use over 10 times fewer indices than the approach of storing a table for triangles of each LOD.

TABLE 1

|  | Table for each LOD | Tables for even and odd LODs |
| --- | --- | --- |
| Inner Tessellation Factor 16 | 8,976 | 2,886 |
| Inner Tessellation Factor 32 | 68,640 | 11,910 |
| Inner Tessellation Factor 64 | 536,640 | 48,390 |

Table 2 shows a comparison between the number of domain points stored for a case in which individual tables are stored for each level of detail (LOD) (left) versus tables just for even and odd LODs (right).

TABLE 2

|  | Storage of domain points as floating points | Storage of domain points as signed integers |
| --- | --- | --- |
| Inner Tessellation Factor 16 | 1,495 | 481 |
| Inner Tessellation Factor 32 | 11,439 | 1,985 |
| Inner Tessellation Factor 64 | 89,439 | 8,065 |

Table 3 shows the total memory footprint used to store a table for a tessellation for each level of detail as compared to various embodiments that store two tables for even and odd numbered levels of detail. In particular, table 3 shows a comparison of memory used for storing triangle indexes as 16-bit unsigned integers for each level of detail as compared to various embodiments that store triangle indexes in two tables for even and odd numbered levels of detail. In addition, table 3 shows a comparison of storing domain points as two 32-bit floating point numbers for each level of detail versus storing domain points as two 8-bit signed integers for each even and odd levels of detail.

TABLE 3

| | Approach that stores each level of detail in an individual table | | | Various embodiments that store two tables: even and odd factors | | |
|---|---|---|---|---|---|---|
| | Indices | Domain Points | Total Storage | Indices | Domain Points | Total Storage |
| Inner Tessellation Factor 16 | 17.5 kb | 11.7 kb | 29.2 kb | 5.6 kb | 0.9 kb | 6.6 kb |
| Inner Tessellation Factor 32 | 134.0 kb | 89.4 kb | 223.4 kb | 23.3 kb | 3.9 kb | 27.1 kb |
| Inner Tessellation Factor 64 | 1048.1 kb | 698.7 kb | 1746.9 kb | 94.5 kb | 15.8 kb | 110.3 kb |

Figure 8:
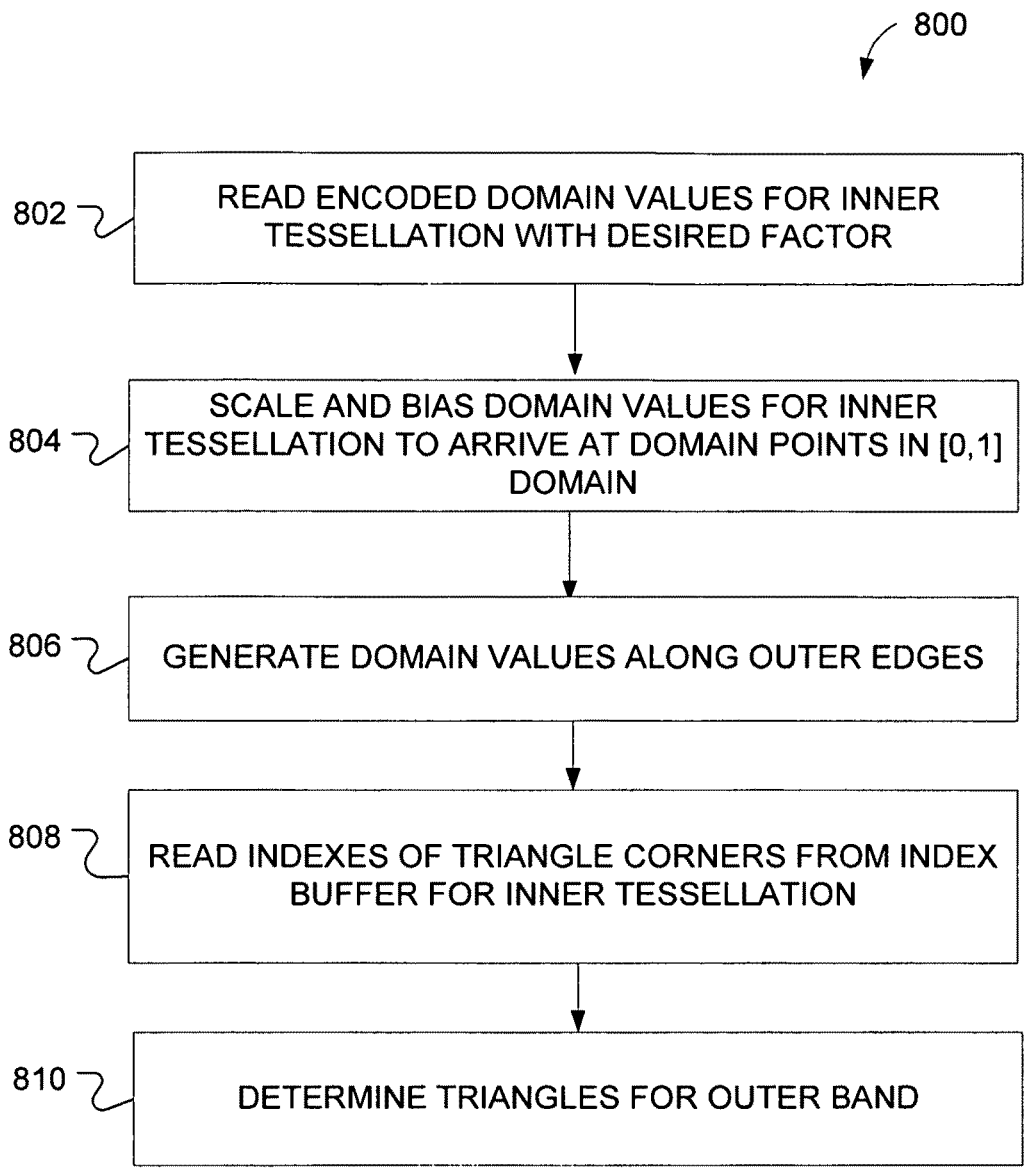
FIG. 8 is a flow chart to generate a patch for one embodiment of the present invention.

In various embodiments, for different edge levels of detail, pre-computed domain values of the various points and the resulting triangulation for the inner tessellation may be pre-determined and stored. During runtime, the domain values of the inner tessellation can be retrieved. FIG. 8 shows a process that can be used to provide triplet pairs of domain points of a tessellation. Thereafter, triangles for the tessellation can be rendered for a display. In block 802, tessellator 18 reads pre-determined encoded domain points for an inner tessellation with the desired factor from storage. The encoded domain points may be stored as two 8-bit signed integers.

In block 804, domain shader 20 performs a scale and bias operation on the pre-determined encoded domain points to produce domain values in the [0,1] domain. Block 804 may convert two 8-bit signed integers to two 32-bit floating point numbers.

In block 806, tessellator 18 generates domain points for an outer band of a tessellation. The u and v values are the coordinates or intervals of the points, as depicted, for example, in FIG. 5A, along the horizontal axis u and the vertical axis v.

In block 808, tessellator 18 reads indexes of triangle corners for each triplet pairs from an index buffer for the inner tessellation. The indexes are associated with coordinates of triangle end points.

In block 810, tessellator 18 determines the triangulation for the outer band, during run time.

Figure 9:
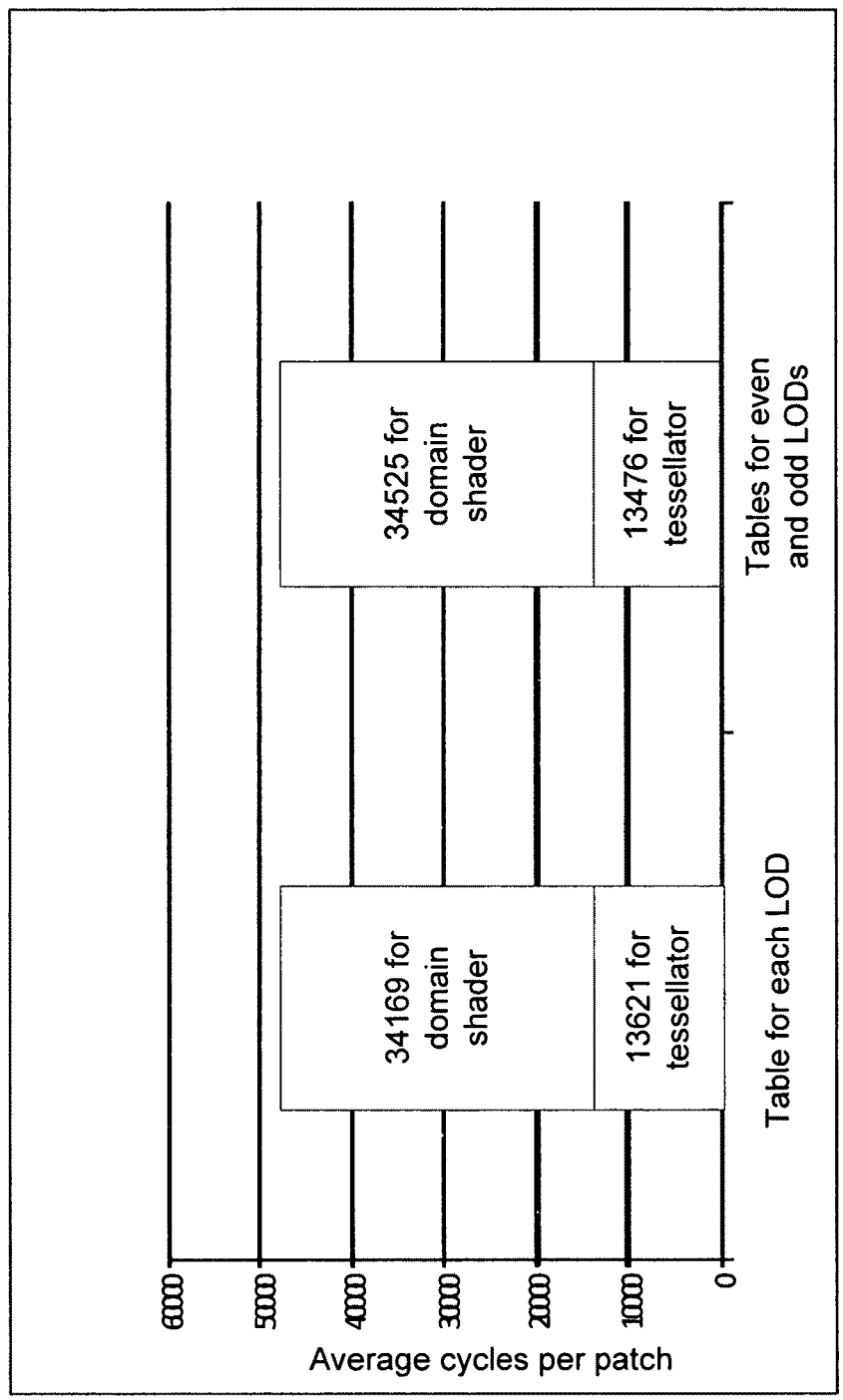
FIG. 9 shows a comparison between the average number of cycles to tessellate and domain shade a patch.

FIG. 9 shows a comparison between the average number of cycles to tessellate and domain shade a patch using a real data set with 1292 patches for an approach that store domain values as floating point values for each level of detail and another approach that stores domain values as unsigned integers in tables for odd and even level of details. Storing domain values as signed integers incurs a very small additional computational cost from decoding. The decoding of the domain points from signed integers to float pointing values in the [0,1] domain slightly affect performance. For example, due to decoding, a minimal slow down of about 1% in the domain shader may occur.

In addition, a speedup of about 1% in the tessellator occurs due to no longer resolving which pre-computed table to use for each patch. The overall performance for tessellator and domain shader slows down by less than 0.5% for storing domain values as unsigned integers in tables for odd and even level of details versus storing domain values as floating point values for each level of detail. If this slowdown is unacceptable, a hybrid solution can be used in which multiple (u,v) buffers are stored but share the index buffers. In such hybrid solution, a table with domain values as floating points is stored for each LOD and index values are stored in tables for even and odd edge factors.

Figure 10:
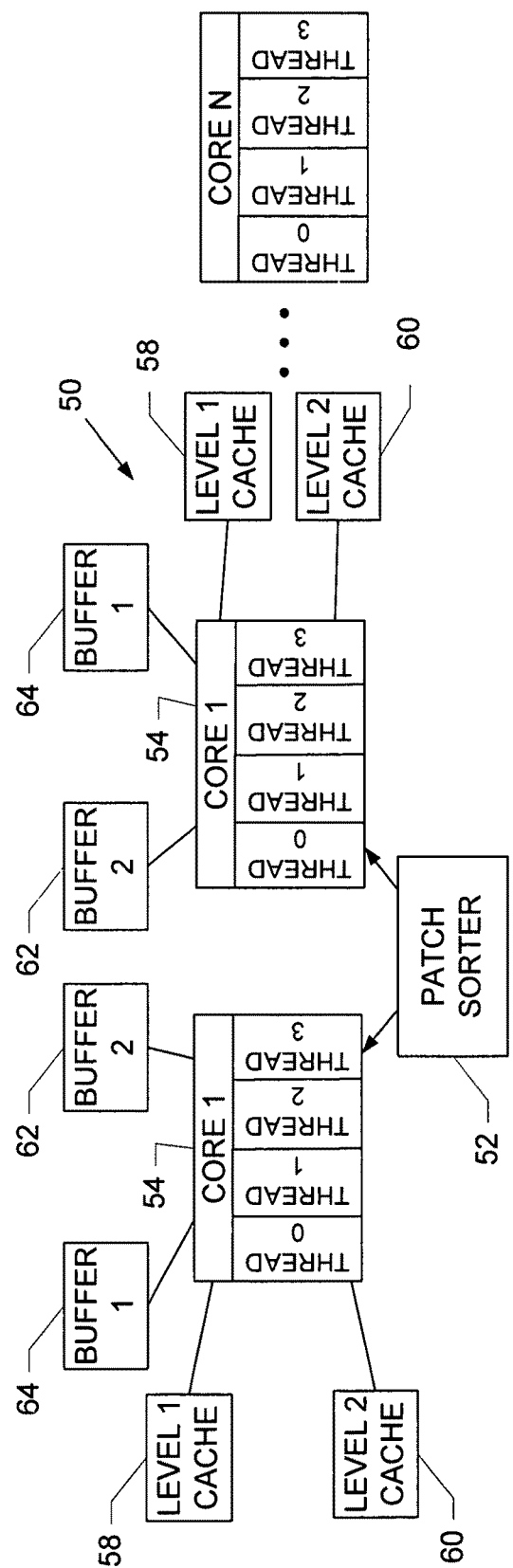
FIG. 10 is a schematic depiction of a multi-core processor according to one embodiment.

In some embodiments, the patches may be sorted, based on their inner tessellation factor, using threading and vectorizing. The patches with the same level of detail are then tessellated on the same physical core of a multi-core processor 50, as indicated in FIG. 10. After sorting and grouping in patch sorter 52, all of the patches to be tessellated having the same inner tessellation level of detail can be sent to the same core 54 or 56 and then all the threads on that core can use only one copy in the core's level one 58 and level two 60 caches. The triangles can then be unsorted using the patch primitive ID at a later point. The outer band tessellation is variable, both in terms of the number of points generated in the triangulation. Thus, a dual buffer approach may be used by placing, in the first buffer 62, the known inner tessellations that were pre-computed. Then the outer tessellation variable part is calculated and stored in the second buffer 64. While only two cores are depicted in FIG. 10, any number of cores may be used.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
    generating, by a computer system, a tessellation based on stored domain points, wherein the generating comprises:
    retrieving pre-computed domain points of an inner tessellation from one of an even tessellation factor table or an odd tessellation factor table; and providing the tessellation for display;
    making an innermost inner tessellation smaller than an outermost inner tessellation; and
    calculating inner tessellations at a plurality of edge levels of detail.

2. The method of claim 1, wherein the generating further comprises:
    converting the domain points to the [0,1] domain.

3. The method of claim 2, wherein the converting comprises:
    converting the domain points from signed integer format to floating point format.

4. The method of claim 1, wherein the retrieving comprises:
    retrieving domain points in an order commencing from an inner most domain point of the tessellation to an outer domain point in a spiral-like order.

5. The method of claim 1, wherein the generating further comprises:
    reading indexes of corner points of triangles from an index buffer.

6. The method of claim 1, wherein the generating further comprises:
    generating domain points along outer edges of the tessellation.

7. The method of claim 1, further comprising:
    arranging at least lower factor tessellation within at least one higher factor tessellation; and
    storing the arranged tessellation in an order commencing from an inner most domain point of the arranged tessellation to an outer domain point in a spiral-like manner.

8. The method of claim 1, further comprising:
    storing indexes of triangle corners in an index buffer, wherein indexes of corners are associated with domain points.

9. The method of claim 1, wherein the tessellation comprises at least one of a quad or a triangle.

10. A non-transitory computer-readable medium that stores instructions, which when executed by a computer, cause the computer to:
    generate a patch based on stored domain points, wherein to generate, the computer is to:
    retrieve pre-computed encoded domain points of an inner tessellation of the patch from one of an even tessellation factor table or an odd tessellation factor table,
    make an innermost inner tessellation smaller than an outermost inner tessellation,
    calculate inner tessellations at a plurality of edge levels of detail,
    convert encoded domain points to the [0,1] domain, and
    retrieve indexes of triangle corners; and provide the patch for display.

11. The computer-readable medium of claim 10, wherein to convert encoded domain points to the [0,1] domain, the computer is to scale and bias the encoded domain points.

12. The computer-readable medium of claim 10, wherein to retrieve encoded domain points, the computer is to:
    retrieve encoded domain points in an order commencing from an inner most encoded domain point of the tessellation to an outer domain point in a spiral-like manner.

13. The computer-readable medium of claim 10, wherein the encoded domain points are stored in an arrangement of at least one lower factor tessellation within at least one higher factor tessellation.

14. The computer-readable medium of claim 10, wherein to generate a patch, the computer is to generate domain points along outer edges of the patch.

15. The computer-readable medium of claim 10, wherein to retrieve indexes of triangle corners, the computer is to retrieve indexes from either a table of even or odd levels of detail.

16. An apparatus comprising:
    a processor unit to generate a patch, wherein to generate a patch, the unit is to retrieve domain points of a patch, wherein to retrieve domain points, the tessellator is to retrieve pre-computed domain points of an inner tessellation from one of an odd table or an even table and said processor to make an innermost tessellation smaller than an outermost inner tessellation and calculate inner tessellations at a plurality of edge levels of detail; and
    a domain shader to convert domain points to [0,1] domain and to generate a three dimensional point on the patch.

17. The apparatus of claim 16, wherein to convert domain points to the [0,1] domain, the domain shader is to scale and bias the encoded domain points.

18. The apparatus of claim 16, wherein to retrieve domain points, the tessellator is to:
    retrieve domain points in an order commencing from an inner most domain point of the inner tessellation to an outer domain point of the inner tessellation in a spiral-like manner.

19. The apparatus of claim 16, wherein the domain points are stored in an arrangement of at least one lower factor tessellation within at least one higher factor tessellation.

20. The apparatus of claim 16, wherein to generate a patch, the tessellator is to generate domain points along outer edges of the patch.

21. The apparatus of claim 16, wherein to generate the patch, the tessellator is also to retrieve indexes of triangle corners from a table of odd or even levels of details.

22. A system comprising:
    a display; and
    a computing system to generate patches to transmit to the display, wherein the computing system comprises:
    a tessellator to generate a patch, wherein to generate a patch, the tessellator is to retrieve domain points of a patch, wherein to retrieve domain points, the tessellator is to retrieve pre-computed domain points of an inner tessellation from one of an odd table or an even table, the tessellator to make an innermost inner tessellation smaller than an outermost inner tessellation and calculate inner tessellations at a plurality of edge levels of detail; and a domain shader to convert domain points to a [0,1] domain and to generate a three dimensional point on the patch.

23. The system of claim 22, wherein to convert domain points to the [0,1] domain, the domain shader is to scale and bias the encoded domain points.

24. The system of claim 22, wherein to retrieve domain points, the tessellator is to:
    retrieve domain points in an order commencing from an inner most domain point of the inner tessellation to an outer domain point of the inner tessellation in a spiral-like manner.

25. The system of claim 22, wherein to generate the patch, the tessellator is also to retrieve indexes of triangle corners from either a table or odd or even levels of details.

\* \* \* \* \*